H. L. HALVERSON.
GREASE CUP.
APPLICATION FILED AUG. 28, 1914.

1,205,734.

Patented Nov. 21, 1916.

Witnesses:

Halbert L. Halverson
Inventor:
Per E. T. Cass,
Attorney.

UNITED STATES PATENT OFFICE.

HALBERT L. HALVERSON, OF WHITEWATER, WISCONSIN.

GREASE-CUP.

1,205,734.　　　　　Specification of Letters Patent.　　Patented Nov. 21, 1916.

Application filed August 28, 1914. Serial No. 859,129.

*To all whom it may concern:*

Be it known that I, HALBERT L. HALVERSON, a citizen of the United States, residing in the city of Whitewater, in the county of Walworth and State of Wisconsin, have invented certain new and useful Improvements in Grease-Cups, of which the following is a specification.

My invention relates to screw compression grease cups and the objects of my invention are, first, to provide a means for firmly locking the screw cap so that the vibration of machinery on which it is used will not cause the screw cap to work on or off from the screw base; second to provide a screw compression grease cup with a lock cap which will permit the grease to flow therefrom without compression when desired and in which the flow of grease from the cup can be entirely cut off. I attain these objects by the use of the mechanism illustrated in the accompanying drawings in which—

Figure 1:
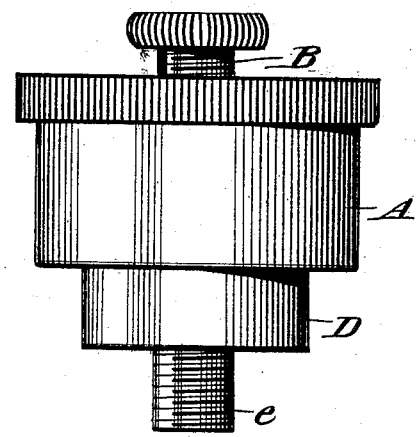
Figure 2:
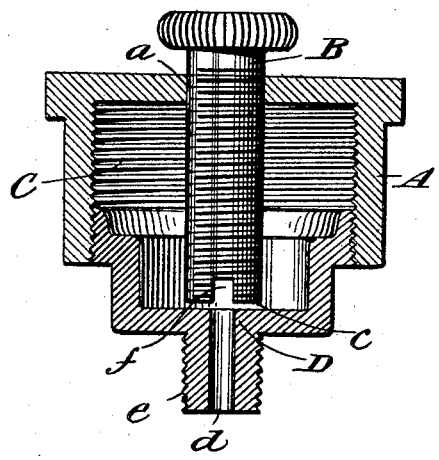

Figure 1 is a perspective view of a screw compression grease cup with my improvement; Fig. 2 is a longitudinal section on a plane through the center of Fig. 1.

Similar letters refer to similar parts throughout the several views.

The screw compression cap A has a round hole in the top with screw threads, $a$, into which a set screw B is fitted so that it can be screwed into the grease chamber C of the cup until the end $c$ of the set screw B strikes the base D of the grease cup covering the opening $d$ which passes through the shank, $e$. When the screw B is loosened the cap A can be turned on or off, but when the screw B is turned until tight the pressure on the base D of the cup locks the cap firmly so that it is not affected by the vibration of the machinery on which the cap is used.

The screw B is made in interchangeable duplicates, alike in all particulars except one has a slot $f$ in the end $c$ and the other has the end $c$ solid.

In operation, the screw B is loosened and the cap A is turned down until sufficient grease is forced into the bearing, then the set screw B is tightened to hold the cap in place. On some bearings it is desirable that grease should be allowed to flow some at all times from the cup without compression, in which case the screw having the slot $f$ is to be used; on other bearings it is desirable to force a certain amount of grease into the bearing and then shut off the supply, in which case the other screw is used.

Having thus described my invention what I claim as new and desire to secure by Letters Patent is—

1. A screw compression grease cup consisting of a base; a screw cap which works over the base; and, a set screw, which projects through the screw cap into and through the grease chamber and against the base whereby the several parts may be bound together substantially as set forth and described for the uses and purposes mentioned.

2. In screw compression grease cups, the combination of the base, the screw cap working over the base, and a set screw working through the cap against the base, in which screw there is a slot cut into and across the end $c$ working against the base over the opening $d$, so that when it is screwed down against the base the end of the screw will not close the opening $d$, but will allow grease from the chamber of the cup to pass through the slot $c$ into and through the opening $d$, all substantially as set forth and described, for the uses and purposes mentioned.

H. L. HALVERSON.

Witnesses:
J. N. THIELE,
F. TYRRELL.

Copies of this patent may be obtained for five cents each, by addressing the "Commissioner of Patents, Washington, D. C."